(12) United States Patent
Delker et al.

(10) Patent No.: US 8,606,637 B1
(45) Date of Patent: Dec. 10, 2013

(54) METHOD FOR PROVIDING PERSONALIZED, TARGETED ADVERTISEMENTS DURING PLAYBACK OF MEDIA

(75) Inventors: Jason R. Delker, Olathe, KS (US); John M. Everson, Leawood, KS (US); Michael A. Gailloux, Overland Park, KS (US); Jarrod A. Nichols, Olathe, KS (US); James W. Norris, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 32 days.

(21) Appl. No.: 13/267,550

(22) Filed: Oct. 6, 2011

Related U.S. Application Data

(63) Continuation of application No. 11/850,029, filed on Sep. 4, 2007, now Pat. No. 8,060,407.

(51) Int. Cl.
  *G06Q 99/00* (2006.01)
(52) U.S. Cl.
  USPC ..................................................... 705/14.66
(58) Field of Classification Search
  USPC ..................................................... 705/14.66
  See application file for complete search history.

(56) References Cited

U.S. PATENT DOCUMENTS

| | | | |
|---|---|---|---|
| 5,038,211 A | 8/1991 | Hallenbeck | |
| 5,264,933 A | 11/1993 | Rosser et al. | |
| 5,721,827 A | 2/1998 | Logan et al. | |
| 5,732,216 A | 3/1998 | Logan et al. | |
| 5,774,170 A | 6/1998 | Hite et al. | |
| 5,892,536 A | 4/1999 | Logan et al. | |
| 5,892,554 A | 4/1999 | DiCicco et al. | |
| 5,926,624 A | 7/1999 | Katz et al. | |
| 6,006,257 A | 12/1999 | Slezak | |
| 6,055,566 A | 4/2000 | Kikinis | |
| 6,169,542 B1 | 1/2001 | Hooks et al. | |
| 6,240,555 B1 | 5/2001 | Shoff et al. | |
| 6,282,713 B1 | 8/2001 | Kitsukawa et al. | |
| 6,351,736 B1 | 2/2002 | Weisberg et al. | |
| 6,463,468 B1 | 10/2002 | Buch et al. | |
| 6,553,222 B1 | 4/2003 | Weiss | |
| 6,578,070 B1 | 6/2003 | Weaver et al. | |
| 6,615,408 B1 | 9/2003 | Kaiser et al. | |
| 6,698,020 B1 | 2/2004 | Zigmond et al. | |

(Continued)

FOREIGN PATENT DOCUMENTS

WO  0237828 A2  5/2002

OTHER PUBLICATIONS

Office Action dated May 24, 2011, U.S. Appl. No. 11/466,643.

(Continued)

*Primary Examiner* — Traci L. Casler

(57) ABSTRACT

A media player is provided. The media player comprises a communications interface, a memory store containing a plurality of personalized advertisements, and a media playback component. The targeted advertisements are refreshed by receiving updates from the communications interface during some of the intervals when the media player is connected to a network. The targeted advertisements are indexed by a plurality of characteristics, the first characteristic being a creation date of the targeted advertisements. The media playback component is configured to play a media content, wherein the media content is stored separately from the targeted advertisements, and to play one of the targeted advertisements in the memory store selected based on the characteristics of the one of the targeted advertisements.

18 Claims, 8 Drawing Sheets

(56) References Cited

U.S. PATENT DOCUMENTS

| | | | |
|---|---|---|---|
| 6,718,551 B1 * | 4/2004 | Swix et al. ............... 725/32 |
| 6,795,702 B2 | 9/2004 | Sennett | |
| 7,006,881 B1 | 2/2006 | Hoffberg et al. | |
| 7,051,357 B2 | 5/2006 | Carr | |
| 7,134,132 B1 | 11/2006 | Ngo et al. | |
| 7,178,158 B2 | 2/2007 | Nishina et al. | |
| 7,206,748 B1 | 4/2007 | Gruse et al. | |
| 7,412,484 B1 | 8/2008 | Kikinis | |
| 7,444,659 B2 | 10/2008 | Lemmons | |
| 7,483,964 B1 | 1/2009 | Jackson et al. | |
| 7,509,178 B2 | 3/2009 | Logan et al. | |
| 7,519,273 B2 | 4/2009 | Lowthert et al. | |
| 7,568,213 B2 | 7/2009 | Carhart et al. | |
| 7,624,337 B2 | 11/2009 | Sull et al. | |
| 7,779,438 B2 | 8/2010 | Davies | |
| 7,831,243 B2 | 11/2010 | Thomas | |
| 8,010,418 B1 | 8/2011 | Lee | |
| 8,046,803 B1 | 10/2011 | Lee | |
| 8,060,407 B1 | 11/2011 | Delker et al. | |
| 8,204,073 B1 | 6/2012 | Gailloux et al. | |
| 2001/0001159 A1 | 5/2001 | Ford | |
| 2001/0047298 A1 | 11/2001 | Moore et al. | |
| 2002/0007493 A1 | 1/2002 | Butler et al. | |
| 2002/0083445 A1 | 6/2002 | Flickinger et al. | |
| 2002/0087402 A1 | 7/2002 | Zustak et al. | |
| 2002/0100045 A1 | 7/2002 | Rafey et al. | |
| 2002/0120925 A1 | 8/2002 | Logan | |
| 2002/0131511 A1 | 9/2002 | Zenoni | |
| 2002/0144262 A1 | 10/2002 | Plotnick et al. | |
| 2002/0147987 A1 | 10/2002 | Reynolds et al. | |
| 2002/0169540 A1 | 11/2002 | Engstrom | |
| 2002/0174425 A1 | 11/2002 | Markel et al. | |
| 2003/0001846 A1 | 1/2003 | Davis et al. | |
| 2003/0011477 A1 | 1/2003 | Clapper | |
| 2003/0028873 A1 | 2/2003 | Lemmons | |
| 2003/0037335 A1 | 2/2003 | Gatto et al. | |
| 2003/0070182 A1 | 4/2003 | Pierre et al. | |
| 2003/0073411 A1 | 4/2003 | Meade, II | |
| 2003/0093790 A1 | 5/2003 | Logan et al. | |
| 2003/0093794 A1 | 5/2003 | Thomas et al. | |
| 2003/0110130 A1 | 6/2003 | Pelletier | |
| 2003/0126597 A1 | 7/2003 | Darby et al. | |
| 2003/0135853 A1 | 7/2003 | Goldman et al. | |
| 2003/0149975 A1 | 8/2003 | Eldering et al. | |
| 2003/0149983 A1 | 8/2003 | Markel | |
| 2003/0158780 A1 | 8/2003 | Isobe et al. | |
| 2003/0163815 A1 | 8/2003 | Begeja et al. | |
| 2003/0226142 A1 | 12/2003 | Rand | |
| 2004/0006767 A1 | 1/2004 | Robson et al. | |
| 2004/0034874 A1 | 2/2004 | Hord et al. | |
| 2004/0073915 A1 | 4/2004 | Dureau | |
| 2004/0194131 A1 | 9/2004 | Ellis et al. | |
| 2004/0261100 A1 | 12/2004 | Huber et al. | |
| 2005/0009525 A1 | 1/2005 | Evslin | |
| 2005/0120391 A1 | 6/2005 | Haynie et al. | |
| 2005/0137958 A1 | 6/2005 | Huber et al. | |
| 2006/0015409 A1 | 1/2006 | Kato et al. | |
| 2006/0092966 A1 | 5/2006 | Sitnik et al. | |
| 2006/0126556 A1 | 6/2006 | Jiang et al. | |
| 2006/0136399 A1 | 6/2006 | Conwell et al. | |
| 2006/0168630 A1 | 7/2006 | Davies | |
| 2006/0218577 A1 | 9/2006 | Goodman et al. | |
| 2006/0259930 A1 | 11/2006 | Rothschild | |
| 2006/0265657 A1 | 11/2006 | Gilley | |
| 2007/0067267 A1 | 3/2007 | Ives | |
| 2007/0078944 A1 | 4/2007 | Charlebois et al. | |
| 2007/0130015 A1 | 6/2007 | Starr et al. | |
| 2007/0135087 A1 | 6/2007 | Villevieille et al. | |
| 2007/0157247 A1 | 7/2007 | Cordray et al. | |
| 2007/0186228 A1 | 8/2007 | Ramaswamy et al. | |
| 2007/0204310 A1 | 8/2007 | Hua et al. | |
| 2007/0214476 A1 | 9/2007 | Zalewski et al. | |
| 2007/0226761 A1 | 9/2007 | Zalewski et al. | |
| 2007/0250901 A1 | 10/2007 | McIntire et al. | |
| 2007/0276729 A1 | 11/2007 | Freer | |
| 2007/0294773 A1 | 12/2007 | Hydrie et al. | |
| 2008/0009268 A1 | 1/2008 | Ramer et al. | |
| 2008/0040768 A1 | 2/2008 | Robotham | |
| 2008/0103886 A1 | 5/2008 | Li et al. | |
| 2008/0109843 A1 | 5/2008 | Ullah | |
| 2008/0148320 A1 | 6/2008 | Howcroft | |
| 2008/0153413 A1 | 6/2008 | Li et al. | |
| 2008/0189736 A1 | 8/2008 | Edwards et al. | |
| 2008/0227467 A1 | 9/2008 | Barnes et al. | |
| 2008/0256572 A1 | 10/2008 | Chen | |
| 2008/0262958 A1 | 10/2008 | Ku et al. | |
| 2008/0276270 A1 | 11/2008 | Kotaru et al. | |
| 2008/0294694 A1 | 11/2008 | Maghfourian et al. | |
| 2008/0304805 A1 | 12/2008 | Baharav et al. | |
| 2008/0319828 A1 | 12/2008 | Southam et al. | |
| 2009/0083815 A1 | 3/2009 | McMaster et al. | |
| 2009/0171721 A1 | 7/2009 | LeBaron et al. | |
| 2009/0171787 A1 | 7/2009 | Mei et al. | |
| 2009/0210898 A1 | 8/2009 | Childress et al. | |
| 2009/0228922 A1 | 9/2009 | Haj-Khalil et al. | |
| 2009/0328095 A1 | 12/2009 | Vinokurov et al. | |
| 2010/0010887 A1 | 1/2010 | Karlin et al. | |
| 2010/0138884 A1 | 6/2010 | Lau | |
| 2010/0145796 A1 | 6/2010 | Berry et al. | |
| 2010/0166389 A1 | 7/2010 | Knee et al. | |
| 2010/0205628 A1 | 8/2010 | Davis et al. | |
| 2011/0171982 A1 | 7/2011 | Wang et al. | |

OTHER PUBLICATIONS

Notice of Allowance dated Feb. 16, 2012, U.S. Appl. No. 11/466,643.
Final Office Action dated Aug. 26, 2011, U.S. Appl. No. 11/466,558, 21 pages.
Final Office Action dated Sep. 7, 2012, U.S. Appl. No. 12/606,276, filed Oct. 27, 2009.
Advisory Action dated Oct. 31, 2012, U.S. Appl. No. 12/606,276, filed Oct. 27, 2009.
Delker, Jason R., et al., "Method and System for Selecting Advertisements to Display on a Television," U.S. Appl. No. 12/110,277, filed Apr. 25, 2008.
Delker, Jason R., et al., "Media Insertion Points," U.S. Appl. No. 12/243,735, filed Oct. 1, 2008.
Izdepski, Erich, et al., "Dual Channel and Communication in Fusion (Phone/Cable)," U.S. Appl. No. 12/107,762, filed Apr. 22, 2008.
Zhu, Kevin, "Multimedia Product Placement Marketplace," U.S. Appl. No. 12/606,276, filed Oct. 27, 2009.
Izdepski, Erich, et al., "Multimedia Broadcast Discovery and Delivery," filed Sep. 26, 2006, U.S. Appl. No. 11/527,929.
Delker, Jason R., et al., "Video Content Tagging System and Method," filed Oct. 13, 2006, U.S. Appl. No. 11/580,719.
Gailloux, et al., "Enabling Communication Between End Points of Different Networks," filed Aug. 23, 2006, U.S. Appl. No. 11/466,558.
Gailloux, et al., "Personalized Television," filed Aug. 26, 2006, U.S. Appl. No. 11/466,643.
Federal Communications Commission, 47 C.F.R. 73.682(a), Oct. 1, 2003.
Advanced Television Systems Committee, "ATSC Recommended Practice: Program and System Information Protocol Implementation Guidelines for Broadcasters", Doc. A/69, Jun. 25, 2002.
M. Nilsson, "ID3 Tag Version 2.4.0—Native Frames", Nov. 1, 2000, http://www.id3.org/id3v2.4.0-frames.txt.
M. Nilsson, "ID3 Tag Version 2.4.0—Main Structure", Nov. 1, 2000, http://www.id3.org/id3v2.4.0-structure.txt.
Office Action dated Feb. 25, 2009, U.S. Appl. No. 11/617,707, filed Dec. 28, 2006, 14 pages.
Final Office Action dated Aug. 19, 2009, U.S. Appl. No. 11/617,707, filed Dec. 28, 2006, 17 pages.
Office Action dated Nov. 10, 2009, U.S. Appl. No. 11/617,707, filed Dec. 28, 2006, 21 pages.
Final Office Action dated May 26, 2010, U.S. Appl. No. 11/617,707, filed Dec. 28, 2006, 21 pages.
Advisory Action dated Aug. 3, 2010, U.S. Appl. No. 11/617,707, filed Dec. 28, 2006, 3 pages.
Office Action dated Oct. 7, 2010, U.S. Appl. No. 11/617,707, filed Dec. 28, 2006.

(56) References Cited

OTHER PUBLICATIONS

Final Office Action dated Apr. 13, 2011, U.S. Appl. No. 11/617,707, filed Dec. 28, 2006.
Notice of Allowance dated Jun. 10, 2011, U.S. Appl. No. 11/617,707, filed Dec. 28, 2006.
Corrected Notice of Allowability dated Aug. 5, 2011, U.S. Appl. No. 11/617,707, filed Dec. 28, 2006.
Office Action dated Aug. 4, 2010, U.S. Appl. No. 11/850,029, filed Sep. 4, 2007, 11 pages.
Office Action to Restriction dated Jan. 11, 2011, U.S. Appl. No. 11/850,029, filed Sep. 4, 2007.
Final Office Action dated Apr. 28, 2011, U.S. Appl. No. 11/850,029, filed Sep. 4, 2007.
Notice of Allowance dated Aug. 5, 2011, U.S. Appl. No. 11/850,029, filed Sep. 4, 2007.
Office Action dated Oct. 22, 2010, U.S. Appl. No. 12/107,762, filed Apr. 22, 2008.
Final Office Action dated Mar. 14, 2011, U.S. Appl. No. 12/107,762, filed Apr. 22, 2008.
Office Action dated Sep. 28, 2010, U.S. Appl. No. 12/110,277, filed Apr. 25, 2008.
Final Office Action dated Apr. 13, 2011, U.S. Appl. No. 12/110,277, filed Apr. 25, 2008.
Advisory Action dated Jun. 8, 2011, U.S. Appl. No. 12/110,277, filed Apr. 25, 2008.
Office Action dated Sep. 19, 2011, U.S. Appl. No. 12/110,277, filed Apr. 25, 2008.
Office Action dated Dec. 27, 2010, U.S. Appl. No. 12/243,735, filed Oct. 1, 2008.
Final Office Action dated May 16, 2011, U.S. Appl. No. 12/243,735, filed Oct. 1, 2008.
Advisory Action dated Jul. 22, 2011, U.S. Appl. No. 12/243,735, filed Oct. 1, 2008.
Office Action dated Aug. 15, 2011, U.S. Appl. No. 12/243,735, filed Oct. 1, 2008.
Final Office Action dated Dec. 6, 2011, U.S. Appl. No. 12/243,735, filed Oct. 1, 2008.
Office Action dated Feb. 20, 2009, U.S. Appl. No. 11/466,643, 25 pages.
Final Office Action dated Sep. 1, 2009, U.S. Appl. No. 11/466,643, 33 pages.
Advisory Action dated Dec. 1, 2009, U.S. Appl. No. 11/466,643, 2 pages.
Office Action dated Feb. 2, 2010, U.S. Appl. No. 11/466,643, 31 pages.
Office Action dated Dec. 29, 2008, U.S. Appl. No. 11/580,719, 29 pages.
Office Action dated Jul. 7, 2009, U.S. Appl. No. 11/580,719, 25 pages.
Notice of Abandonment dated Feb. 1, 2010, U.S. Appl. No. 11/580,719, 2 pages.
Office Action dated Apr. 29, 2009, U.S. Appl. No. 11/466,558, 14 pages.
Final Office Action dated Nov. 3, 2009, U.S. Appl. No. 11/466,558, 19 pages.
Office Action dated Mar. 5, 2010, U.S. Appl. No. 11/466,558, 21 pages.
Office Action—Restriction Requirement dated Mar. 8, 2012, U.S. Appl. No. 12/606,276, filed Oct. 27, 2009.
Advisory Action dated Feb. 14, 2012, U.S. Appl. No. 12/243,735, filed Oct. 1, 2008.
Final Office Action dated Apr. 3, 2012, U.S. Appl. No. 12/110,277, filed Apr. 25, 2008.
FAIPP Pre-Interview Communication dated May 14, 2012, U.S. Appl. No. 12/606,276, filed Oct. 27, 2009.
Advisory Action dated Jun. 15, 2012, U.S. Appl. No. 12/110,277, filed Apr. 25, 2008.
First Action Interview Office Action dated Jul. 18, 2012, U.S. Appl. No. 12/606,276, filed Oct. 27, 2009.

\* cited by examiner

METHOD FOR PROVIDING PERSONALIZED, TARGETED ADVERTISEMENTS DURING PLAYBACK OF MEDIA

CROSS-REFERENCE TO RELATED APPLICATIONS

This application is a continuation of and claims priority under 35 U.S.C. §120 to U.S. patent application Ser. No. 11/850,029, filed on Sep. 4, 2007, entitled "Method for Providing Personalized, Targeted Advertisements During Playback of Media," by Jason R. Delker, et al., now U.S. Pat. No. 8,060,407 B1 issued on Nov. 15, 2011, which is incorporated herein by reference for all purposes. This application contains subject matter related to U.S. patent application Ser. No. 11/617,707, entitled "Contextual Multimedia Metatagging," by Wing K. Lee, filed Dec. 28, 2006, which is incorporated herein by reference for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Media content and multimedia content may include text content, still photos and graphic images, video content, audio content, gaming content, a combination of these, as well as other media content. Media players are configured to playback or present media content to a user, for example playing an audio recording of a song, playing a video recording of a movie, etc. Some media players may be specifically implemented for media playback, for example a digital video disk (DVD) player. Other media players, however, may be multifunctional devices that include the media playback capability as one of many functions. For example, a mobile phone may include a media player capable of playback of various media and multimedia content, as well as including mobile telephone communication functionality, email communication functionality, etc. Media players may have network communication interfaces that promote the media player accessing media and multimedia content through the network communication interface, for example downloading an audio recording of a song or downloading a video segment from a network entity, such as a content server.

Advertisers are interested in coupling advertisements with media and multimedia content in various ways. For example, DVDs are often distributed with embedded advertisements and/or promotional offers that are played before the featured movie plays, sometimes referred to as "trailers." Advertisers are becoming increasingly interested in distributing advertisements to selectively targeted persons or to specific classes of persons who are known to have an above average interest in the content of the advertisement. The interests of classes of persons, for example men over 40 with annual household income over $100,000, may be analyzed by marketing studies. The interests of individuals may be known through interest and usage profiles built from captured purchase information and media consumption behaviors collected at a point of sale or by monitoring communications of the individual. This type of advertising may be referred to as targeted or personalized advertising. Targeted advertising may promote reduction of advertising costs by permitting advertisers to forgo paying for distribution of advertisements to persons who show a low likelihood of responding favorably to the advertisement.

SUMMARY

In an embodiment, a media player is disclosed. The media player comprises a communications interface, a memory store containing a plurality of personalized advertisements, and a media playback component. The targeted advertisements are refreshed by receiving updates from the communications interface during some of the intervals when the media player is connected to a network. The targeted advertisements are indexed by a plurality of characteristics, the first characteristic being a creation date of the targeted advertisements. The media playback component is configured to play a media content, wherein the media content is stored separately from the targeted advertisements, and to play one of the targeted advertisements in the memory store selected based on the characteristics of the one of the targeted advertisements.

In another embodiment, a method of distributing advertising is disclosed. The method comprises embedding metatags in a media content, wherein the metatags designate a subject category, analyzing a usage history of a media player to identify a usage profile of the media player, and transmitting a first plurality of targeted advertisements to storage on the media player during intervals of network connectivity of the media player. The targeted advertisements are selected based on the usage profile of the media player. The method also comprises playing the media content on the media player and selecting one of the targeted advertisements in storage on the media player, where the selecting is based on the media player reading one of the metatags embedded in the media content during the playing the media content. The method also comprises playing the selected targeted advertisement on the media player.

In a further embodiment, a method of operating a media player is disclosed. The method comprises the media player storing in a memory of the media player a first plurality of targeted advertisements received via a network interface of the media player, the media player playing a media content, the media player receiving a control input, and the media player playing one of the targeted advertisements stored in the memory of the media player based on the receiving a control input. The targeted advertisement is selected to avoid interfering with the function selected by the input.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
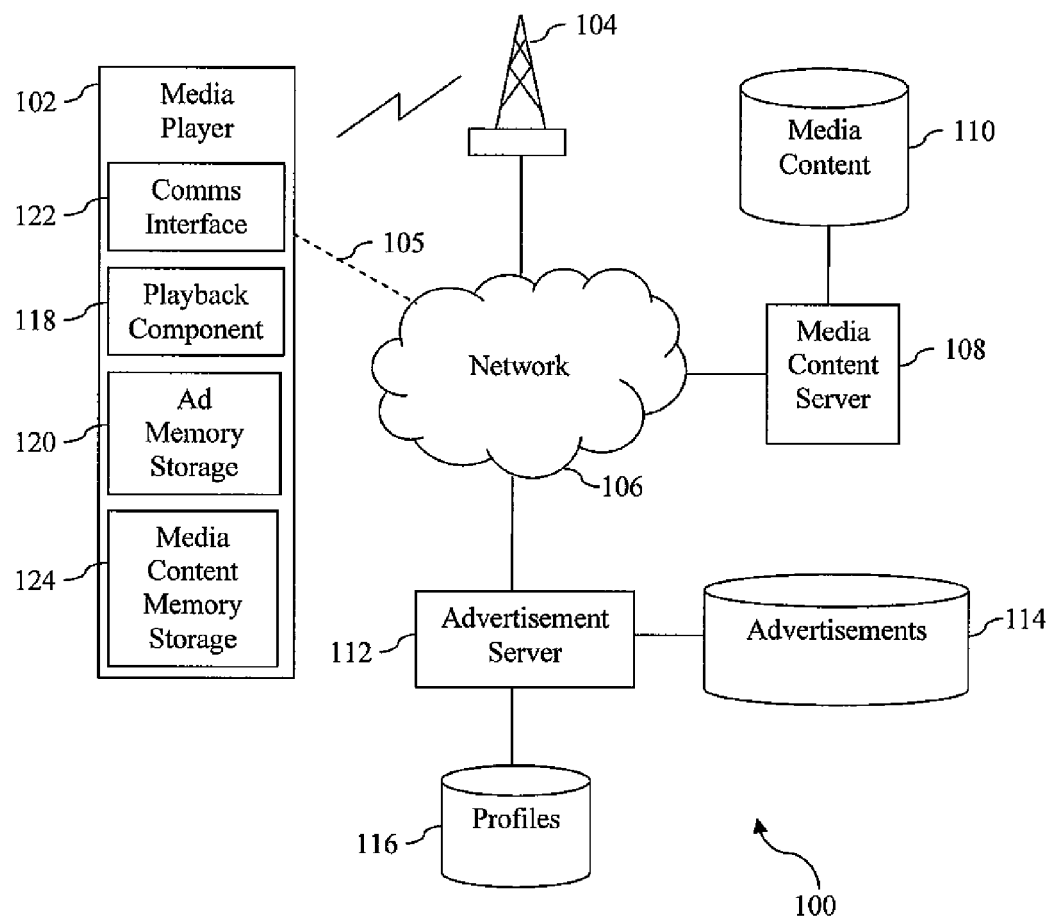
FIG. 1 is an illustration of an advertisement distribution system according to an embodiment of the disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

Advertisements that are embedded in and stored along with media may become stale and lose their ability to influence buying, charitable giving decisions, or other behavior of the consumer of the media content. For example, product advertisements embedded in and burned onto a digital video disc (DVD) containing a movie may be irrelevant when watching the DVD two or more years after its initial release. A method and system for storing a group of targeted advertisements, also known as an "ad ball," on a media player during periods of network connectivity of the media player is described below. The targeted advertisements are selected for storing on the media player based on a usage profile associated with the media player and/or associated with a user of the media player. The media player is configured to select one of the targeted advertisements for playback based on, for example, control inputs received by the media player and based on other media player contextual information. For example, the media player may select a targeted advertisement associated with a brand name that is embedded as a metatag in the media content currently being played back. The metatag may identify a brand name of an electronics company. The usage profile of the media player may indicate an interest in state-of-the-art mobile phones, and consequently several advertisements for different state-of-the-art mobile phones may have been stored in the "ad ball" of the media player during a recent connection to the Internet. While the DVD that contains the embedded metatag may be several years old, the media player can select an advertisement from the "ad ball" of the media player about the newest mobile phone promoted by the brand name of the metatag for play when a pause control input is received. Because the advertisements are stored on the media player, the advertisements can be played back when the media player is off-line and not connected to the network, for example when playing one or more DVDs on a laptop computer while flying on a long distance flight, for example, from Los Angeles, Calif. to Seoul, Korea.

The advertisements can be refreshed during intervals of network connectivity, for example when connecting to the network to access and store media content or to check email. Later, more up-to-date targeted advertisements may replace earlier, aged targeted advertisements. The group of advertisements, the "ad ball," need not be completely refreshed and replaced during every interval of network connectivity. The advertisements may be updated incrementally or in segments, also referred to as trickle updating. The advertisements need not be updated during every interval of network connectivity, and update of the "ad ball" may be arranged to take place during intervals of low network congestion or as a lower priority of network traffic.

Turning now to FIG. 1, a system 100 is described for implementing one or more embodiments of the disclosure. The system 100 comprises a media player 102, a base station 104, a communications network 106, a media content server 108, a media content database 110, an advertisement server 112, an advertisement database 114, and a usage profile database 116. The media player 102 may communicate with the network 106 either wirelessly through base station 104 or through a wired connection 105. The media player 102 may be disconnected from the network 106 some of the time or even most of the time and operate off-line, for example when out of range of the base station 104 or other wireless access device (not shown), when wireless communications are disabled while in flight on an airplane, or when disconnected from the wired connection 105.

The base station 104 is in communication with the network 106, providing network access to the media player 102. The base station 104 may communicate with the media player 102 using any of a variety of well known wireless communications technologies including, but not limited to, code division multiple access (CDMA), global system for mobile communications (GSM), universal mobile telecommunications system (UMTS), worldwide interoperability for microwave access (WiMAX), WiFi, Bluetooth, and other wireless technologies.

The network 106 comprises one or more public switched telephone networks, one or more public data networks, and any combination thereof. The network 106 may carry a variety of communications traffic and promote a variety of communications services including, but not limited to, voice communications, media communications, multimedia communications, streaming video content, streaming audio content, other content distribution, email communications, gaming services, internet protocol (IP) based communications, HTTP communications, and other communications traffic.

The media content server 108 provides media and/or multimedia content to clients via the network 106, for example when the clients have paid for downloading media content such as an audio file, a video file, a multimedia file, or other media content. In an embodiment, the media content server 108 provides media content to the media player 102. The media content server 108 may obtain the requested media content from the media content database 110, which is coupled to the media content server 108, or from another source, for example from the network 106. Alternatively, the media content server 108 may obtain the requested media from a distribution repository (not shown), for example via the network 106. The media content may contain embedded metatags. Alternatively, the media content server 108 may dynamically embed metatags in or otherwise associate metatags with the media content before sending the media content to the media player 102.

The metatags may designate one or more of a subject category, a brand name, an age bracket, an income bracket, a regional designation, a sex, an education level, and a demographic signature. A demographic signature may be a composition of multiple demographic parameters. The metatags may promote playing targeted advertisements and/or providing product information to a consumer of media content.

Additional details about metatags are provided in the related U.S. patent application Ser. No. 11/617,707, entitled "Contextual Multimedia Metatagging," by Wing K. Lee, filed Dec. 28, 2006, which was incorporated herein by reference above. The media content server 108 may be suitably implemented as a general purpose computer system. General purpose computer systems are discussed in greater detail hereinafter.

The advertisement server 112 provides targeted advertisements via the network 106, for example to the media player 102. The advertisement server 112 analyzes a usage profile associated with the media player 102 and/or a user of the media player 102 that is stored in the usage profile database 116. The advertisement server 112 selects advertisements to send to the media player 102 based on the analysis of the usage profile and based on metadata associated with the advertisements. In an embodiment, the advertisement sever 112 may select advertisements to send to the media player 102 based in part on the current position of the media player 102. The selected advertisements are expected to be of interest to the user of the media player 102, wherefore the selected advertisements may be called targeted advertisements.

The usage profiles stored in the usage profile database 116 may contain demographics information associated with the media player 102 and/or the user of the media player 102 including a residence location, a household income level, a head of household age, a head of household education level, a number of children, a marital status, a credit score, and other characterizing statistical data. The usage profiles may contain consumer history including a major purchase history, a credit card purchase history, a media content purchase history, an air travel ticket purchase history, and other purchase history. Additionally, the usage profiles may contain characterizing information provided by the user of the media player 102, for example through a web site that encourages subscribers to a media content provider service to characterize their interests, for example identifying hobbies, preferred genres of media content, social activity schedule, eating habits, working schedule, and other characterizing information. The usage profiles may include federated identity credentials and credit card information. The web site may be hosted by the advertisement server 112 or by a web server (not shown) in communication with the advertisement server 112 or having access to the profiles database 116.

The advertisements database 114 may be maintained by the advertisement server 112 or by another computer system (not shown). The advertisement database 114 may include advertisement media content as well as metadata associated with the advertisement media content. The metadata associated with the advertisement media content may also be referred to as characteristics of the advertisement media content. Some of the metadata may be static and read-only while other of the metadata may be dynamic and writeable. The metadata may include information identifying a party of interest, a number of distributions, a release date, a withdrawal date, a version identifier, a brand name, a subject, a product category, a customer demographic signature, a media format, a playback duration and/or play length, and other information.

In an embodiment, the advertisement server 112 may poll the media player 102 to determine when the media player 102 is connected to the network 106. In another embodiment, the media player 102 may send a message indicating readiness to receive updates of the targeted advertisements stored on the media player 102 to the advertisement server 112, during intervals when the media player 102 is on-line and connected with the network 106. The advertisement server 112 may maintain a history of connection sessions of the media player 102 to promote scheduling future connection sessions. For example, the advertisement server 112 may determine that the media player 102 connects daily during working hours and schedule refreshing or updating targeted advertisements on the media player 102 every Wednesday between 1 PM and 3 PM. In another embodiment, the advertisement server 112 may update the targeted advertisements on the media player 102 daily. In another example, the advertisement server 112 may determine no pattern for the media player 102 to connect to the network 106, and in this case the advertisement server 112 may update targeted advertisements on the media player 102 every time that the media player 102 connects to the network 106.

When the advertisement server 112 communicates with the media server 102, the advertisement server 112 may handshake with the media player 102 to obtain information about the status of the targeted advertisements already stored on the media player 102, for example which of the stored targeted advertisements have been played by the media player 102, how often these played targeted advertisements have been played, which of the stored targeted advertisements have been skipped over and/or fast forwarded through by the media player 102. This information may be referred to as advertisement playback history. Advertisement playback history may be added to the metadata or characteristics of the targeted advertisements after they are stored on the media player 102. Advertisement playback history alternatively may be added to the appropriate usage profile of the media player 102 and/or of the user in a direct or abstracted form and stored in the profiles database 116. The advertisement server 112 may use the playback history of the already stored targeted advertisements to select additional and/or replacement targeted advertisements from the advertisement database 114 to send to the media player 102. The advertisement server 112 may attempt to maintain an effective mix of targeted advertisements on the media player 102, for example short playback duration advertisements, long playback duration advertisements, audio only advertisements, ticker-tape type advertisements and/or scrolling message type advertisements, product advertisements, media content advertisements, service advertisements, and the like.

The advertisement server 112 may attempt to update or refresh an approximate proportion of targeted advertisements on the media player 102 during every communication session, for example one fifth of all targeted advertisements stored on the media player 102. The advertisement server 112 may determine the proportion of targeted advertisements refreshed during every communication session based on how often the media player 102 connects to the network 106, by a roll-over rate of advertisements stored in the advertisement database 114, or by some other dynamic parameter. The updating of a portion or segment of the targeted advertisements on the media player 102 may be referred to a trickle updating.

The advertisement server 112 may be configured to identify a first time connection of the media player 102 to the network 106 and to send a larger than usual set of targeted advertisements to the media player 102 during this initial communication session. The advertisement server 112 may be suitably implemented as a general purpose computer system. General purpose computer systems are discussed in greater detail hereinafter.

The media player 102 is configured to play and control playback of media content of one or more media formats. The media player 102, for example, may be configured to play and control playback of media content including text content, still photos and graphic images, video content, audio content, gaming content, a combination of these, as well as other media content. The media player 102 may be configured to play and control playback of the media content serially, concurrently, and/or both. In some contexts herein, the media player 102 may also be referred to as a multimedia player. In several embodiments, the media player 102 may promote other functions, and the media play capability of the media player 102 may not be the principle capability of the media player 102, for example when the media player 102 is embodied as a laptop computer. The media player 102 may be a radio receiver, CD player, DVD player, television, set top box, desk top computer, laptop computer, tablet computer, mobile phone, personal digital assistant (PDA), IPHONE, IPOD, or other media device. In some embodiments, the media player 102 may be suitably implemented as a handset or as a general purpose computer system. Handsets and general purpose computer systems are described in greater detail hereinafter.

The media player 102 comprises a playback component 118, an advertisement memory storage 120, a communications interface 122, and a media content memory storage 124. The playback component 118 may be able to play a variety of media content and may be able to respond to various control inputs including, but not limited to, play, stop, pause, fast forward, reverse, skip forward, skip back, and other control inputs. The playback component 118 is configured to select and play one of the targeted advertisements stored in the advertisement memory store 120, for example when playback of the media content is paused or when a metatag embedded in or associated with the media content is encountered during playback. The targeted advertisements may be stored in the advertisement memory store 120 and may be coupled to characteristics or metadata associated with each of the targeted advertisements.

In an embodiment, some of the media content may be stored on the media player 102, for example in a media content memory storage 124. The advertisement memory storage 120 and the media memory storage 124 may be different regions or address ranges of a single memory component or, alternatively, the advertisement memory storage 120 and the media memory storage 124 may be implemented in separate memory components or memory chips. The media content may be received by the media player 102 from the network 106 via the base station 104 or via the wired connection 105, for example from the media content server 106. The wired connection may be a universal serial bus (USB) connection, a serial connection, an Ethernet connection, or other wired connection. The media content may also be received by the media player 102 from another wireless source, for example via BlueTooth, WiFi, WiMAX, ultra-wideband (UWB), or other wireless link or connection. In some contexts, the loading of the media content via one or more wired or wireless connections may be referred to as side-loading media content to the media player 102. The media content may be provided to the media player 102 in the form of a DVD, HD-DVD, BLU-RAY DISC, memory stick, jump drive, magnetic tape, or other removable physical media.

In an embodiment, some of the media content may be advertisement linked content, meaning the media content may be offered by a content distributor for free or at a discounted rate because playing the media entails seeing advertisements coupled to the advertisement linked content. For example, when the media player 102 plays a free music content, for example by the playback component 118, one of the targeted advertisements may be selected from the advertisement memory storage 120 and played by the playback component 118, before playing the free music content. During playback of advertisement linked content some of the control inputs of the media player 102 may be disabled to prevent skipping or fast forwarding through the targeted advertisement.

Figure 2:
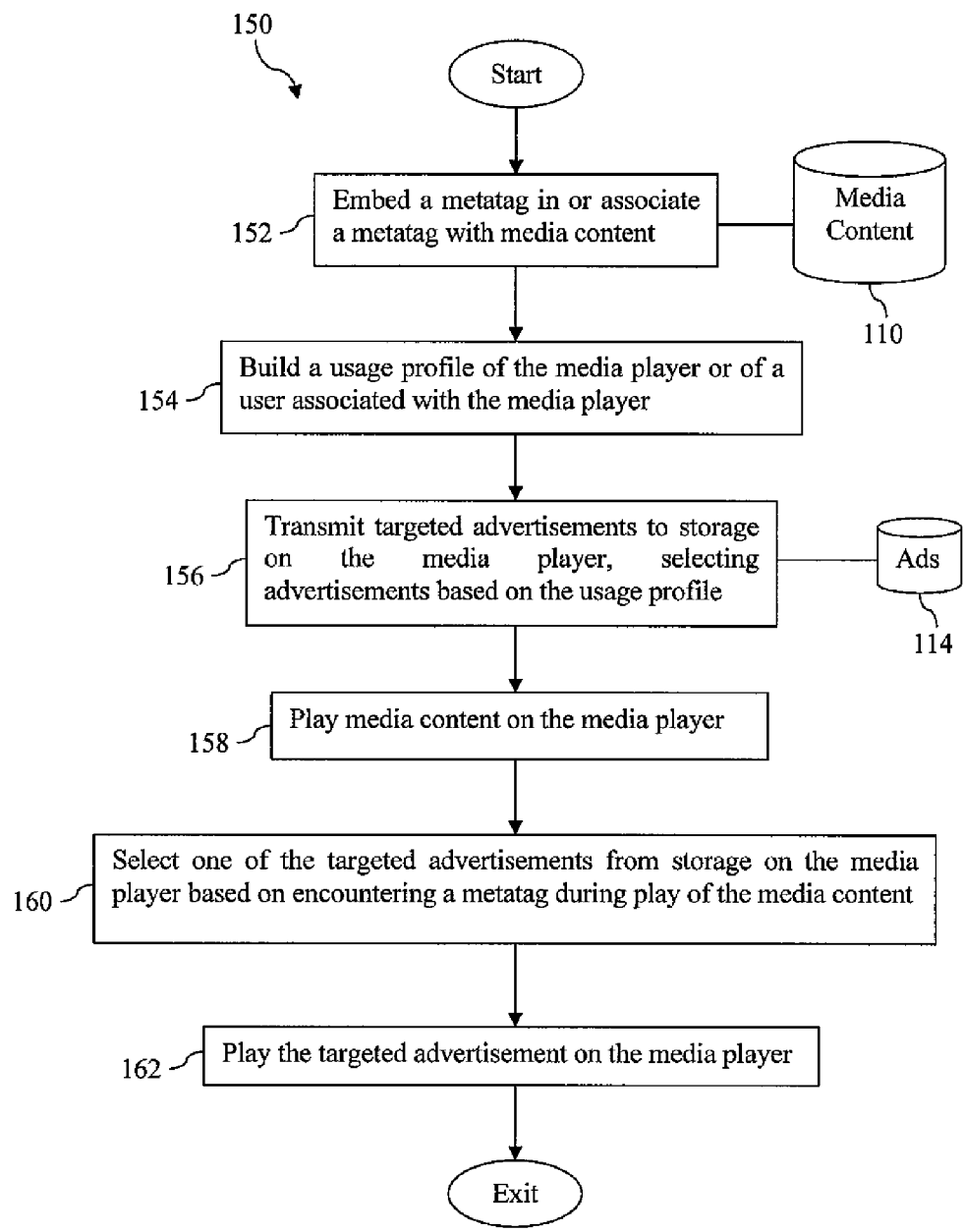
FIG. 2 is a flow chart of a method for advertisement distribution according to an embodiment of the disclosure.

Turning now to FIG. 2, a flowchart of a method 150 will be described. At block 152 a metatag is embedded in or associated with a media content, for example media content stored in media content database 110. The metatag may be written into a file or other digital information recording structure storing the media content and stored in the media content database 110. Alternatively, the metatag may contain a pointer, a link, or other means for associating itself with the media content. In this case, when the media content is delivered, for example by the media content server 108, both the media content and the associated metatags are served to the requesting client, for example the media player 102. Alternatively, the metatag may be embedded in the content by a distributor, for example a distributor of DVDs.

At block 154 a usage profile of the media player 102 or of a user associated with the media player 102 is built. The usage profile may include information provided directly by the user of the media player 102, information characterizing the behavior and habits of the user based on analysis of historical data of network communication activities of the user, demographic information about the user obtained from various sources, purchasing information associated with the user obtained from retailers and financial entities, and other information. The process of building the usage profile may be on-going, wherein the usage profile evolves as new information accumulates about the user. The process of building the usage profile may involve an aging component, wherein more recent information carries more importance than older information. The usage profile may be stored in the usage profiles database 116.

At block 156 advertisements are selected, for example from the advertisements database 114, based on the usage profile and transmitted to the media player 102 to be stored in the advertisement memory storage 120. The selection of advertisements allows the advertisements transmitted to the media player 102 to be targeted to the media player 102 or to the user of the media player 102, thereby increasing the value of this advertising for a party of interest associated with the advertising, for example a company marketing a product that has paid for the advertisement. The targeted advertisements are sent to the media player 102 when the media player 102 is on-line or connected to the network 106. The targeted advertisements are stored on the media player 102, for example in the advertisement memory storage 120. The group of targeted advertisements stored in the advertisement memory storage 120 may be referred to as an "ad ball." The process of sending targeted advertisements to the media player 102 may be periodically repeated to partially update or refresh the targeted advertisements on the media player 102 or in the "ad ball" of the media player 102. The process of sending targeted advertisements to the media player 102 may occur aperiodically, during random periods of connectivity of the media player 102 with the network 106.

At block 158 the media player 102, for example the playback component 118, plays the media content. The media player 102 may play a mass distribution DVD. Alternatively, the media player 102 may obtain the media content from an on-line source, for example the media content server 108, in the form of a digital file. The media player 102 may be connected to or disconnected from the network 106, either on-line or off-line, respectively, during the playing of the media content.

At block 160 the playback component 118 encounters the metatag embedded in the media content, as described above with reference to block 152. In an embodiment, the playback component 118 may select one of the targeted advertisements from the advertisement memory storage 120. This also may be referred to as selecting one of the targeted advertisements from the "ad ball." The metatag may identify a brandname, for example a major car manufacturer, and be associated with a point in the media content featuring a driving scene. The playback component 118 may search the "ad ball" and select a targeted advertisement for a car associated with the brandname of the metatag. In another embodiment, the playback component 118 may select the targeted advertisement for play based at least in part on the current location of and/or the mobility status of the media player 102. The media player 102 may be capable of self-locating, for example by using a global positioning system (GPS) chipset installed in the media player 102, may be configured with its location, or may have its general location determined based on its point of connection to the network 106. The mobility status of the media player may represented by one of a finite number of mobility states, for example a stationary mobility state, a slow motion mobility state, and a rapid motion mobility state. The mobility status of the media player alternatively may be represented as an approximate speed or velocity. In yet another embodiment, the playback component 118 may select the targeted advertisement for play based at least in part on the time-of-day. The described selection scenario is exemplary, and many other processes for selecting a targeted advertisement for playback based on the playback component 118 based on metatags readily suggest themselves to one skilled in the art, all of which are contemplated by the present disclosure. In another embodiment, some other component of the media player 102, other than the playback component 118, may select the targeted advertisement for playback.

At block 162 the playback component 118 plays the selected targeted advertisement. Because the targeted advertisements are stored on the media player 102, for example in the advertisement memory storage 120, the advertisement can be played while the media player 102 is off-line, for example when the user of the media player 102 is flying on an airplane, riding in a vehicle, or when the device is out of coverage. Additionally, because the targeted advertisements are maintained up-to-date on the media player 102, the targeted advertisements may be substantially current, notwithstanding the date of the media content.

In another embodiment, the media player 102 may be a digital video disk (DVD) player that has connectivity to the network 106, or may be connected upon occasion to the network 106, for reasons other than obtaining media content for playback. The DVD player may be designed to receive media content on disks. When the disk contains metatags, the media player 102 may choose an appropriate ad for playback from the ad memory storage when the media player 102 reads a metatag while playing back the media content on the disk. In an embodiment, the disk may contain embedded advertisements that may rapidly become outdated. When a standard DVD player plays back the content on the disk, the embedded advertisement is played, even though it is outdated. When the media player 102 plays back the content on the disk, when the metatag associated with the embedded advertisement is encountered, the media player 102 may determine that the embedded advertisement is outdated and may instead select an updated advertisement from the ad memory storage 120, for example an updated advertisement downloaded from the network 106 during a period of connectivity, and playback the updated advertisement. In an embodiment, the updated advertisement may or may not be targeted to a user of the media player 102 based on a usage profile or usage history.

Figure 3:
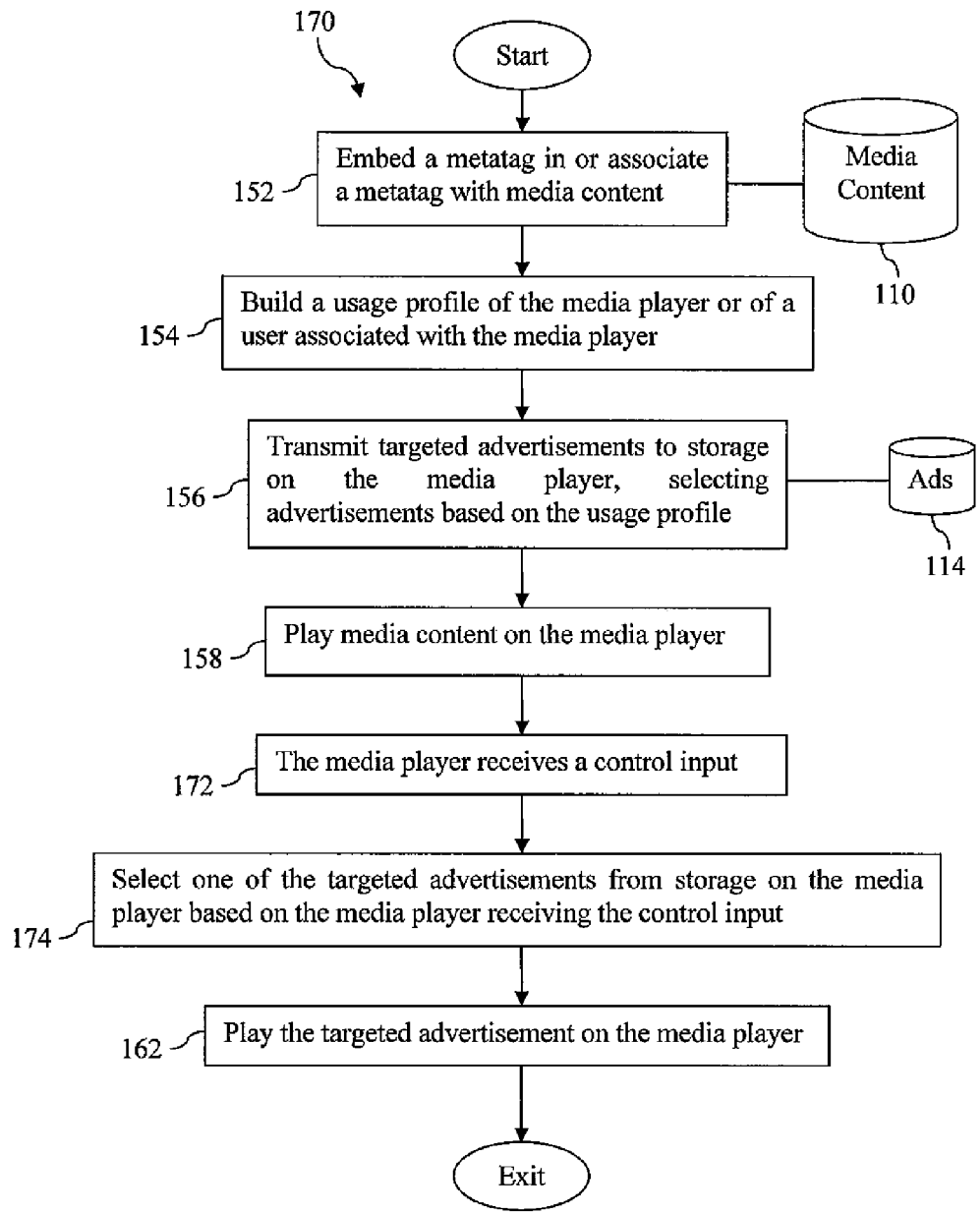
FIG. 3 is a flow chart of another method for advertisement distribution according to an embodiment of the disclosure.

Turning now to FIG. 3, a flowchart of a method 170 will be described. The method 170 is substantially similar to the method 150, except that in method 170 the playing of the targeted advertisement is triggered by the media player 102 receiving a control input. At block 172 the media player 102 receives a control input.

At block 174 the playback component 118 selects one of the targeted advertisements from the "ad ball" based on the control input. The playback component 118 may select the targeted advertisement based on the context of the media player 102. For example, if the playback component 118 had been playing a DVD and the media player 102 receives a pause control input, the playback component 118 may select a targeted advertisement that features a video segment that repeatedly loops, for example a movie trailer or some other advertisement. In another example, if the playback component 118 had been playing a DVD, and the media player receives a fast forward control input, the playback component 118 may select a targeted advertisement that comprises an audio advertisement so as not to interfere with the fast forward operation. In another embodiment, the playback component 118 may select the targeted advertisement for play based, at least in part, on the current location and/or the mobility status of the media player 102 and/or on the time-of-day. Alternatively, the playback component 118 may select a targeted advertisement that can be displayed using a picture-in-picture display format. Alternatively, the playback component 118 may select a targeted advertisement that comprises a ticker-tape type targeted advertisement and/or scrolling message targeted advertisement at a border of the display.

Figure 4:
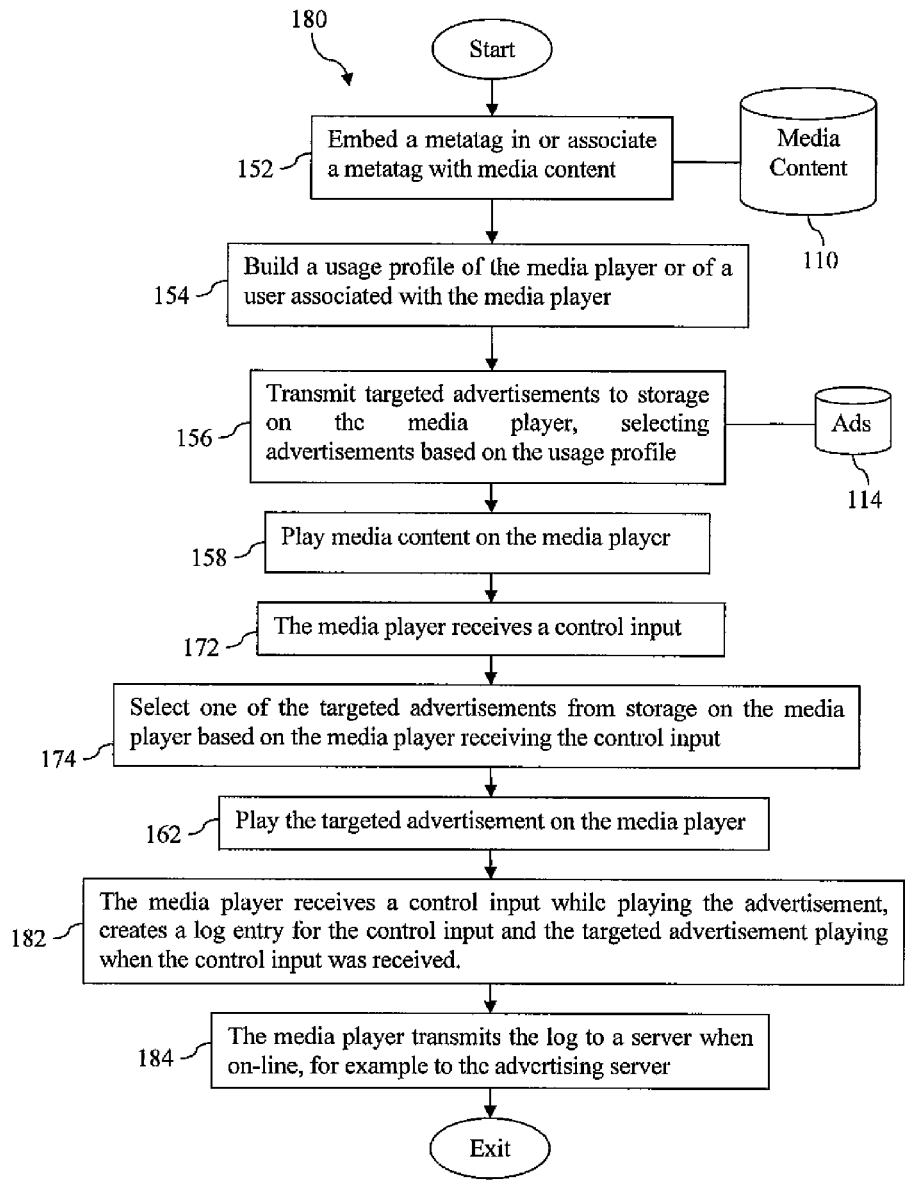
FIG. 4 is a flow chart of a further method for advertisement distribution according to an embodiment of the disclosure.

Turning now to FIG. 4, a flowchart of a method 180 will be described. The method 180 is substantially the similar to that of the method 170, up to block 182. At block 182 the media player 102 receives a control input while playing the targeted advertisement, for example a fast forward, a skip forward, a rewind, a slow motion, or other control input. In this event, the media player 102 creates a log entry associated with this event recording, for example, the targeted advertisement that had been in process of being played, the media content that had been or continued to be played when the targeted advertisement was played, the specific control input received, a time of the event, and other information.

At block 184 the media player 102 transmits the log entry, including any other accumulated log entries, to a server during an on-line session, when the media player 102 is connected to the network 106. The server may be the advertisement server 112 or some other server. The log entry may be analyzed by the advertisement server 112, by the media content server 108, or other server to refine and evolve the process of selecting targeted advertisements for the specific media player 102 that transmitted the log entry and/or the user associated with the specific media player 102. The log entry may be used to refine and evolve the process of selecting targeted advertisements for all media players 102, as for example by a process of statistical analysis of a mass of log entries received from many media players 102.

Figure 5:
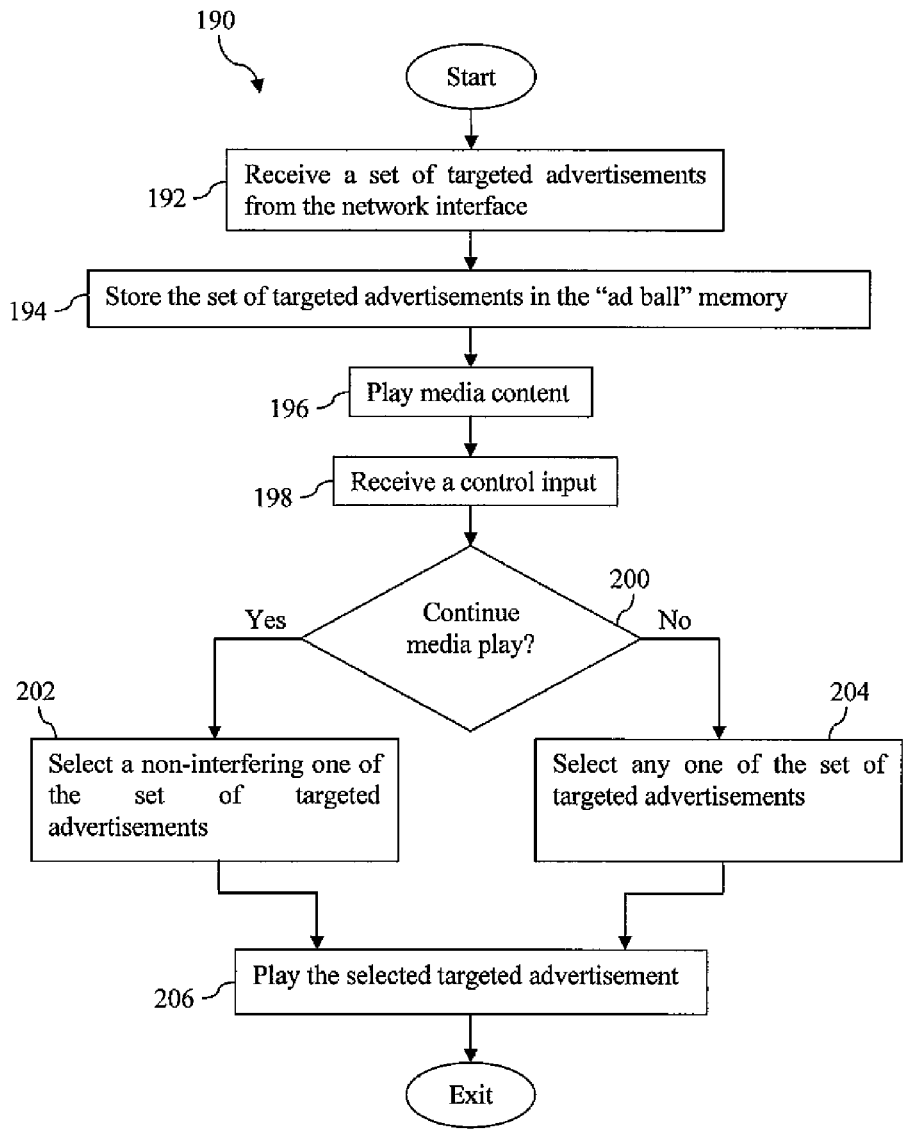
FIG. 5 is a flow chart of a different method for advertisement distribution according to an embodiment of the disclosure.

Turning now to FIG. 5, a flow chart of a method 190 will be described. At block 192 the media player 102 receives a set of targeted advertisements over or through the communication interface 122. This may be an update or refresh of targeted advertisements for the media player 102 or it may be an initial installation of targeted advertisements. The targeted advertisements are received during an interval of connection with the network 106, when the media player 102 is on-line.

At block 194 the media player 102 stores the set of targeted advertisements in the "ad ball," in the advertisement storage memory 120. As part of the processing associated with this block, the media player 102 may delete some older targeted advertisements stored during earlier on-line sessions. Alternatively, the media player 102 may overwrite some older targeted advertisements by later targeted advertisements specifically intended to replace the earlier overwritten targeted advertisement, as for example an updated mobile phone targeted advertisement may overwrite an earlier mobile phone targeted advertisement by the same phone manufacturer or service provider.

At block 196 the media content is played by the playback component 118. At block 198 the media player 102 receives a control input. At block 200 if the media content will continue to play in response to the control input, as for example if a fast forward control input is received, the process proceeds to block 202 where a non-interfering targeted advertisement is selected from the "ad ball" for play. If the media content will not continue to play in response to the control input, as for example if a pause or stop control input is received, the process proceeds to block 204 where any targeted advertisement is selected from the "ad ball" for play. In an embodiment, at both block 202 and block 204, the playback component 118 may select the targeted advertisement for play based at least in part on the current location and/or the current mobility status of the media player 102. In another embodiment, the playback component 118 may select the targeted advertisement for play based at least in part on the time-of-day. The targeted advertisement may be selected based on what stored targeted advertisements have not yet been played, based on how often the stored targeted advertisements have been played, based on the subject of the media content, or based on another contextual factor.

At block 206 the playback component 118 plays the selected targeted advertisement.

Figure 6:
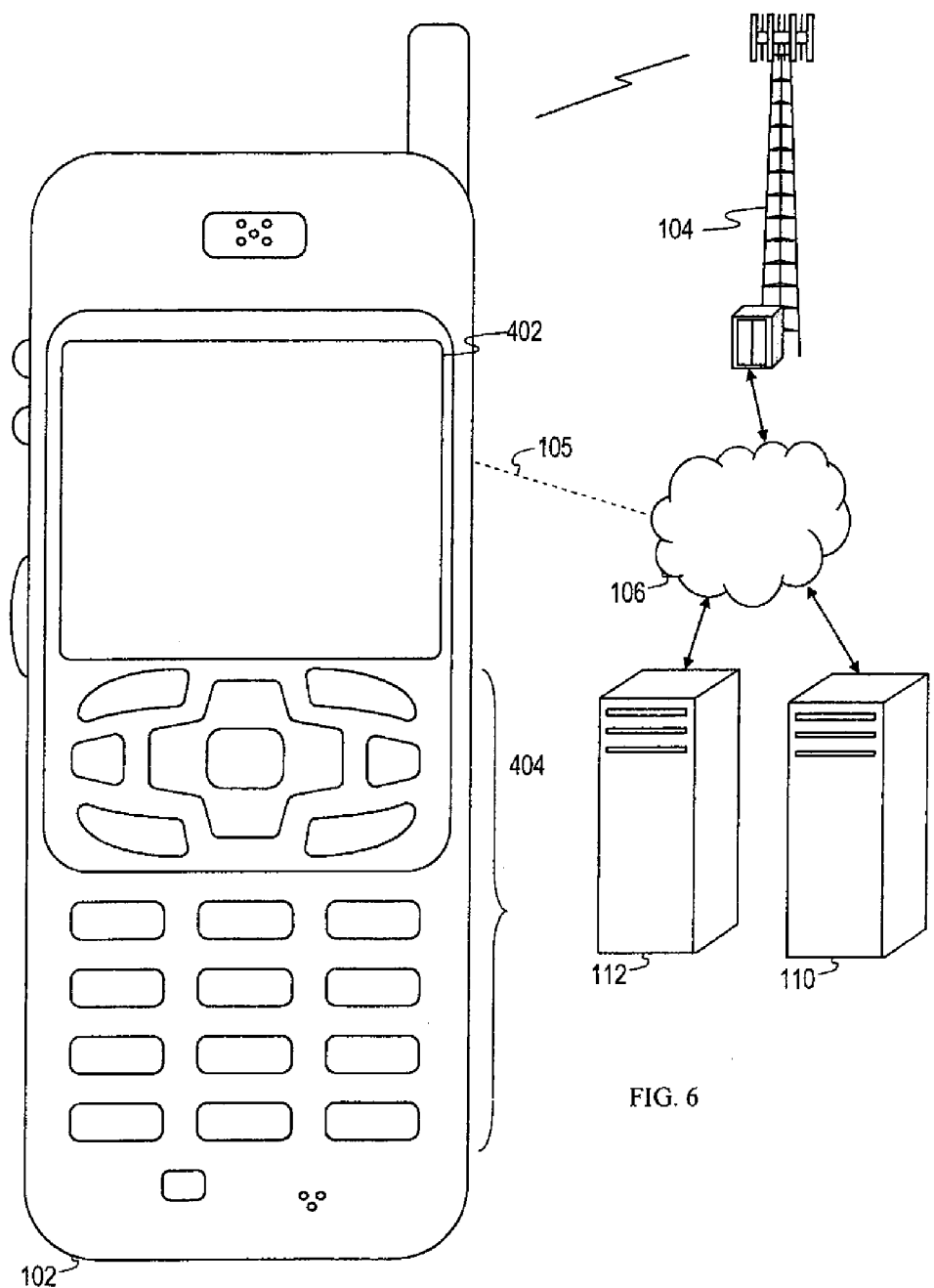
FIG. 6 is an illustration of a handset suitable for implementing several embodiments of the disclosure.

Turning now to FIG. 6, a wireless communications system including a handset embodiment of the media player 102 is discussed. FIG. 6 depicts the media player 102 as a handset, which is operable for implementing aspects of the present disclosure, but the present disclosure should not be limited to these implementations. Though illustrated as a mobile phone, the media player 102 may take various forms as enumerated heretofore. In some embodiments of the present disclosure, the media player 102 may support specialized activities such as gaming, inventory control, job control, and/or task management functions, and so on.

The media player 102 includes a display 402 and a touch-sensitive surface or keys 404 for input by a user. The display 402 may be used to view media content. The media player 102 may present options for the user to select, controls for the user to actuate, and/or cursors or other indicators for the user to direct. The media player 102 may further accept data entry from the user, including numbers to dial or various parameter values for configuring the operation of the handset. The media player 102 may further execute one or more software or firmware applications in response to user commands. These applications may configure the media player 102 to perform various customized functions in response to user interaction. Additionally, the media player 102 may be programmed and/or configured over-the-air, for example from the wireless base station 104, a wireless access point, or a peer handset.

Figure 7:
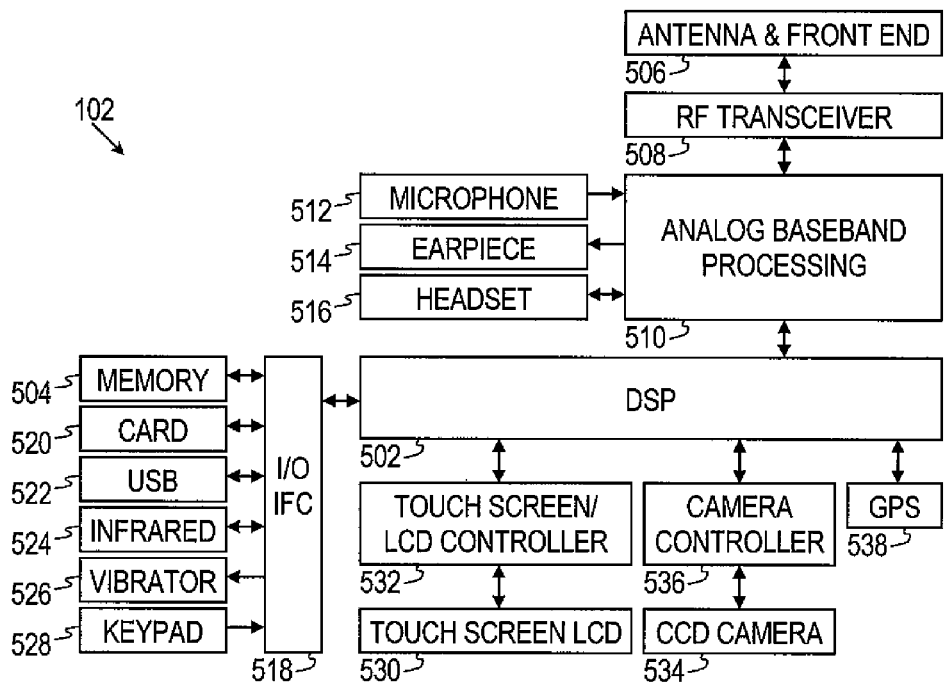
FIG. 7 is a block diagram of a handset suitable for implementing several embodiments of the disclosure.

FIG. 7 shows a block diagram of the media player 102. While a variety of known components of handsets 102 are depicted, in an embodiment a subset of the listed components and/or additional components not listed may be included in the media player 102. The media player 102 includes a digital signal processor (DSP) 502 and a memory 504. The memory 504 may, for example, include the advertisement memory storage 120 and the media content memory storage 124. As shown, the media player 102 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the media player 102 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the media player 102 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the media player 102 to send and receive information from a cellular network or some other available wireless communications network or from a peer handset. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast fourier transforming (IFFT)/fast fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 508, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset 516 and outputs to the earpiece 514 and the headset 516. To that end, the analog baseband processing unit 510 may have ports for connecting to the built-in microphone 512 and the earpiece speaker 514 that enable the media player 102 to be used as a cell phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast fourier transforming (IFFT)/fast fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast fourier transforming, and cyclic prefix appending, and for a receiver function the DSP 502 may perform cyclic prefix removal, fast fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB interface 522 and the infrared port 524. The USB interface 522 may enable the media player 102 to function as a peripheral device to exchange information with a personal computer or other computer system. The infrared port 524 and other optional ports such as a Bluetooth interface or an IEEE 802.11 compliant wireless interface may enable the media player 102 to communicate wirelessly with other nearby handsets and/or wireless base stations.

The input/output interface 518 may further connect the DSP 502 to the vibrator 526 that, when triggered, causes the media player 102 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the media player 102. Another input mechanism may be the touch screen LCD 530, which may also display text and/or graphics to the user. The touch screen LCD controller 532 couples the DSP 502 to the touch screen LCD 530.

The CCD camera 534 enables the media player 102 to take digital pictures. The DSP 502 communicates with the CCD camera 534 via the camera controller 536. The GPS sensor 538 is coupled to the DSP 502 to decode global positioning system signals, thereby enabling the media player 102 to determine its position. In another embodiment, a camera operating according to a technology other than Charge Coupled Device cameras may be employed. Various other peripherals may also be included to provide additional functions, e.g., radio and television reception.

Figure 8:
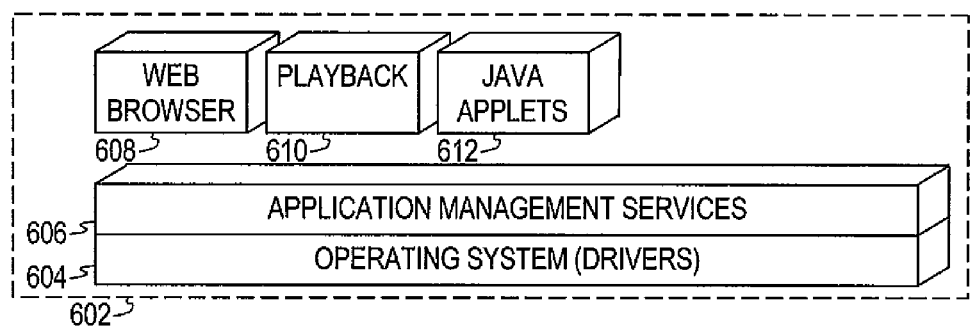
FIG. 8 is a block diagram of a software architecture of a handset suitable for implementing several embodiments of the disclosure.

FIG. 8 illustrates a software environment 602 that may be implemented by the DSP 502. The DSP 502 executes operating system drivers 604 that provide a platform from which the rest of the software operates. The operating system drivers 604 provide drivers for the handset hardware with standardized interfaces that are accessible to application software. The operating system drivers 604 include application management services ("AMS") 606 that transfer control between applications running on the media player 102. Also shown in FIG. 6 are a web browser application 608, a playback application 610 associated with the playback component 118, and JAVA applets 612. The web browser application 608 configures the media player 102 to operate as a web browser, allowing a user to enter information into forms and select links to retrieve and view web pages. The playback application 610 configures the playback component 118 to play media. The JAVA applets 612 configure the media player 102 to provide games, utilities, and other functionality.

Figure 9:
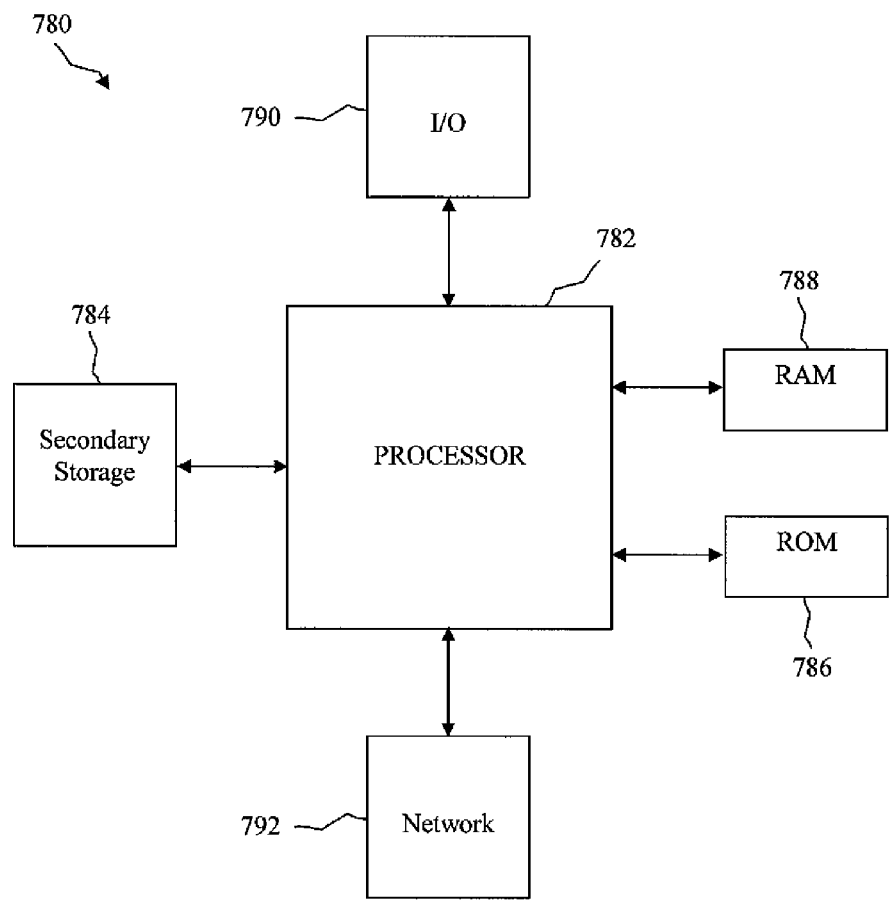
FIG. 9 illustrates an exemplary general purpose computer system suitable for implementing the several embodiments of the disclosure.

Portions of the system 100 described above, for example the media content sever 108, the advertisement server 112, and the media player 102, may be implemented on any general-purpose computer with sufficient processing power, memory resources, and network throughput capability to handle the necessary workload placed upon it. FIG. 9 illustrates a typical, general-purpose computer system suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor may be implemented as one or more CPU chips.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage. The RAM 788 is used to store volatile data and perhaps to store instructions. When the media player 102 is implemented as a general purpose computer, for example a laptop computer, the RAM 788 may include the advertisement memory storage 120 and the media content memory storage 124. Access to both ROM 786 and RAM 788 is typically faster than to secondary storage 784.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 792 may enable the processor 782 to communicate with an Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave Such information, which may include data or instructions to be executed using processor 782 for example, may be received from and outputted to the network, for example, in the form of a computer data baseband signal or signal embodied in a carrier wave. The baseband signal or signal embodied in the carrier wave generated by the network connectivity devices 792 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of distributing advertising, comprising:
    embedding, by a media content server, a metatag in a media content, wherein the metatag comprises identifying information;
    analyzing, by an advertisement server, a usage history of a media player to identify a usage profile associated with the media player;
    selecting, by the advertisement server, a plurality of targeted advertisements based on the usage profile associated with the media player;
    transmitting, by the advertisement server, the plurality of targeted advertisements to storage on the media player during intervals of network connectivity of the media player;
    storing, by the media player, the media content comprising the metatag;
    playing, by the media player, the stored media content on the media player;
    encountering, by the media player, the metatag during the playing of the media content;
    in response to the encountering of the metatag, selecting, by the media player, a relevant targeted advertisement of the plurality of targeted advertisements based on the identifying information in the metatag, wherein only a subset of the plurality of targeted advertisements satisfies the identifying information; and
    playing, by the media player, the relevant targeted advertisement.

2. The method of claim 1, wherein the identifying information in the metatag designates a brand name, and wherein selecting the relevant targeted advertisement includes selecting at least one of the plurality of targeted advertisements that is associated with the brand name.

3. The method of claim 1, further including selecting, by the media player, another targeted advertisement of the plurality of targeted advertisements in storage on the media player based on the media player receiving a control input.

4. The method of claim 1, further including:
    creating, by the media player, a log of a control input received by the media player during the playing of the relevant targeted advertisement; and
    transmitting, by the media player, the log to the advertisement server during an interval of network connectivity of the media player, wherein targeted advertisements are selected by the advertisement server based in part on the log.

5. The method of claim 1, wherein the identifying information of the metatag designates at least one of a subject category, a brand name, an age bracket, an income bracket, a regional designation, a sex, an education level, or a demographic signature.

6. The method of claim 1, further including selecting, by the media player, another targeted advertisement of the plurality of targeted advertisements in storage on the media player based at least in part on one of a time-of-day, a mobility status of the media player, or a location of the media player.

7. The method of claim 3, further including playing, by the media player, the other targeted advertisement of the plurality of targeted advertisements on the media player without substantially interfering with an interaction of a user with the media player.

8. The method of claim 7, wherein the substantial interference with the interaction of the user with the media player is avoided by selecting one of an audio-only targeted advertisement or a scrolling message targeted advertisement.

9. The method of claim 1, wherein the media content is one of a multimedia content, a television show, a digital video disk, a video game disk, an on-line game, a compact disk audio recording, a streaming video, a radio broadcast, or an audio recording file.

10. The method of claim 1, wherein the plurality of targeted advertisements is stored on the media player over a plurality of separate network connectivity sessions.

11. The method of claim 1, wherein the playing of the media content is paused during the playing of the relevant targeted advertisement, and wherein the media player ignores control inputs to stop, fast forward through, and skip over the relevant targeted advertisement during the playing of the relevant targeted advertisement.

12. A method of distributing advertising, comprising:
embedding, by a media content server, a metatag in a media content, wherein the metatag comprises identifying information;
analyzing, by an advertisement server, a usage history of a media player to identify a usage profile associated with the media player;
selecting, by the advertisement server, a first plurality of targeted advertisements based on the usage profile associated with the media player;
transmitting, by the advertisement server, the first plurality of targeted advertisements to storage on the media player during intervals of network connectivity of the media player;
storing, by the media player, the media content comprising the metatag;
playing for a first time, by the media player, the stored media content;
encountering, by the media player, the metatag during the first playing of the media content;
in response to the encountering of the metatag, selecting, by the media player, a first relevant targeted advertisement of the first plurality of targeted advertisements based on the identifying information in the metatag, wherein only a subset of the first plurality of targeted advertisements satisfies the identifying information;
playing, by the media player, the first relevant targeted advertisement;
analyzing again, by the advertisement server, the usage history of the media player to identify an updated usage profile associated with the media player;
selecting, by the advertisement server, a second plurality of targeted advertisements based on the updated usage profile associated with the media player;
transmitting, by the advertisement server, the second plurality of targeted advertisements to storage on the media player during intervals of network connectivity of the media player;
playing for a second time, by the media player, the stored media content;
encountering again, by the media player, the metatag during the second playing of the media content;
in response to encountering the metatag again, selecting, by the media player, a second relevant targeted advertisement of the second plurality of targeted advertisements based on the identifying information in the metatag, wherein only a subset of the second plurality of targeted advertisements satisfies the identifying information; and
playing, by the media player, the second relevant targeted advertisement of the second plurality of targeted advertisements, wherein the second relevant targeted advertisement is different from the first relevant targeted advertisement.

13. The method of claim 12, wherein the transmitting of the second plurality of targeted advertisements occurs after the transmission of the first plurality of targeted advertisements, and wherein at least one of the second plurality of targeted advertisements replaces one of the first plurality of targeted advertisements in storage on the media player.

14. The method of claim 12, wherein the second plurality of targeted advertisements is stored on the media player over a plurality of separate network connectivity sessions, and wherein the second plurality of targeted advertisements replace some of the first plurality of targeted advertisements.

15. The method of claim 12, further including:
creating, by the media player, a log of a control input received by the media player during the playing of the first relevant targeted advertisement; and
transmitting, by the media player, the log to the advertisement server during an interval of network connectivity of the media player, wherein targeted advertisements are selected by the advertisement server based in part on the log.

16. The method of claim 12, wherein the identifying information of the metatag designates at least one of a subject category, a brand name, an age bracket, an income bracket, a regional designation, a sex, an education level, or a demographic signature.

17. The method of claim 12 further including selecting, by the media player, another targeted advertisement of the first plurality of targeted advertisements in storage on the media player based at least in part on one of a time-of-day, a mobility status of the media player, or a location of the media player.

18. The method of claim 12, wherein the media content is one of a multimedia content, a television show, a digital video disk, a video game disk, an on-line game, a compact disk audio recording, a streaming video, a radio broadcast, or an audio recording file.

* * * * *